United States Patent
Luzzato et al.

(10) Patent No.: US 10,766,810 B2
(45) Date of Patent: Sep. 8, 2020

(54) TARGETED CHEMICAL STRENGTHENING OF GLASS ARTICLES

(71) Applicant: Apple Inc., Cupertino, CA (US)

(72) Inventors: Victor Luzzato, Santa Clara, CA (US); Tyler A. Marshall, Sunnyvale, CA (US); Christopher C. Bartlow, Menlo Park, CA (US); Dale N. Memering, Langhorne, PA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 15/890,260

(22) Filed: Feb. 6, 2018

(65) Prior Publication Data

US 2019/0100457 A1    Apr. 4, 2019

Related U.S. Application Data

(60) Provisional application No. 62/566,101, filed on Sep. 29, 2017.

(51) Int. Cl.

| C03C 21/00 | (2006.01) |
|---|---|
| C03C 15/00 | (2006.01) |
| C03C 19/00 | (2006.01) |
| B28D 1/18 | (2006.01) |
| C03B 23/03 | (2006.01) |

(52) U.S. Cl.
CPC ............. *C03C 21/002* (2013.01); *B28D 1/18* (2013.01); *C03B 23/0302* (2013.01); *C03C 15/00* (2013.01); *C03C 19/00* (2013.01); *C03C 2204/08* (2013.01); *C03C 2218/34* (2013.01)

(58) Field of Classification Search
None
See application file for complete search history.

(56) References Cited

U.S. PATENT DOCUMENTS

| 6,595,028 B1* | 7/2003 | Miyamoto | C03C 19/00 65/30.1 |
|---|---|---|---|
| 8,393,175 B2 | 3/2013 | Kohli et al. | |
| 8,937,689 B2 | 1/2015 | Prest et al. | |
| 2009/0162703 A1* | 6/2009 | Kawai | C03C 21/00 428/832 |
| 2010/0279067 A1 | 11/2010 | Sabia et al. | |
| 2011/0019123 A1 | 1/2011 | Prest et al. | |
| 2012/0027399 A1* | 2/2012 | Yeates | C03C 21/002 396/535 |
| 2012/0052302 A1 | 3/2012 | Matusick et al. | |
| 2012/0236477 A1* | 9/2012 | Weber | C03C 21/003 361/679.01 |
| 2012/0236526 A1 | 9/2012 | Weber | |

(Continued)

FOREIGN PATENT DOCUMENTS

| WO | WO-2010101961 A2 | 9/2010 |
|---|---|---|
| WO | WO-2011041484 A1 | 4/2011 |

*Primary Examiner* — David Sample
(74) *Attorney, Agent, or Firm* — Morgan, Lewis & Bockius LLP (57) ABSTRACT

Components of an electronic device, such as glass articles, are susceptible to breakage, especially in regions where machining a glass article has created flaws. Chemical strengthening can be performed to create deeper compression layers at regions of a glass article that have been machined, include and/or are adjacent to an edge feature, have greater surface roughness, and/or have more or deeper cracks.

19 Claims, 8 Drawing Sheets

(56) References Cited

U.S. PATENT DOCUMENTS

2013/0122254 A1* 5/2013 Liang .................... C03C 21/002
                                                          428/156
2018/0057400 A1* 3/2018 Fukada ................... C03C 17/34
2018/0290921 A1* 10/2018 Ahmed ................ H05K 5/0017

* cited by examiner

TARGETED CHEMICAL STRENGTHENING OF GLASS ARTICLES

CROSS-REFERENCE TO RELATED APPLICATION

This application claims the benefit of U.S. Provisional Application No. 62/566,101, entitled "TARGETED CHEMICAL STRENGTHENING OF GLASS ARTICLES," filed Sep. 29, 2017, the entirety of which is incorporated herein by reference.

TECHNICAL FIELD

The present description relates generally to glass articles for devices, and, more particularly, to targeted chemical strengthening of glass articles for electronic devices.

BACKGROUND

Some portable electronic devices contain glass, either internal or external. Externally, a glass article can be provided as part of a housing. Such a glass article is often referred to as a cover glass. The transparent and scratch-resistance characteristics of glass make it well suited for such applications. Internally, a glass article can be provided to support display technology. More particularly, to support a display a portable electronic device can provide a display technology layer beneath an outer cover glass. A sensing arrangement can also be provided with or adjacent to the display technology layer. By way of example, the display technology layer may include a liquid crystal display ("LCD") that includes a liquid crystal module ("LCM"). The LCM generally includes an upper glass sheet and a lower glass sheet that sandwich a liquid crystal layer there between. The sensing arrangement may be a touch sensing arrangement such as those used to create a touch screen. For example, a capacitive sensing touch screen can include substantially transparent sensing points or nodes dispersed about a sheet of glass.

Unfortunately, however, use of glass with portable electronic devices requires that the glass be relatively thin. Generally speaking, the thinner the glass the more susceptible the glass is to damage when the portable electronic device is stressed or placed under a significant force.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Any component of an electronic device is susceptible to breakage if used in an abusive manner. For example, a glass article can be a weak point of an electronic device in terms of strength against bending and damage if dropped. As a result, the glass article can be susceptible to damage when the electronic device is stressed, for example in a drop event. This problem is exacerbated in view of the continuing need to make components smaller and therefore thinner. While a thin glass article is naturally susceptible to damage, the glass article can be chemically strengthened to reduce its susceptibility to damage.

Chemical strengthening is particularly beneficial in regions that contain small cracks. Such cracks can be created when the glass article is shaped by machining (e.g., removal of material by grinding). Through chemical strengthening, ion exchange within a glass article results in formation of a compression layer that contains ions, such as alkali metal ions, that have a larger radius than a radius of the displaced ions. The portion of the glass article containing the compression layer is subject to greater internal expansive forces. Formation of a compression layer in regions containing cracks helps strengthen these regions by forcing the regions around the cracks to be expanded against each other. This reduces the glass article's susceptibility to crack propagation.

However, if excessive chemical strengthening is applied to the glass article, the resulting internal expansive forces can increase a risk of shattering the glass article upon stress or impact. Chemical strengthening can optimally improve a glass article's resistance to damage when the depth of compression layer is targeted according to a region's need for chemical strengthening. Some regions of a glass article can have deeper compression layers relative to other regions of the glass article, so that protection is provided where it is most beneficial, without incurring excessive internal expansive forces across the entirety of the glass article. As a result, the glass article is less susceptible to uncontrolled cracking or breaking when subjected to significant abnormal forces, such as a drop event.

According to some embodiments of the present disclosure, more extensive chemical strengthening can be performed to create deeper compression layers at regions of a glass article that have been machined. According to some embodiments of the present disclosure, more extensive chemical strengthening can be performed to create deeper compression layers at regions of a glass article that include or are adjacent to an edge feature. According to some embodiments of the present disclosure, more extensive chemical strengthening can be performed to create deeper compression layers at regions of a glass article that have greater surface roughness. According to some embodiments of the present disclosure, more extensive chemical strengthening can be performed to create deeper compression layers at regions of a glass article that have more or deeper cracks.

According to some embodiments of the present disclosure, the glass article can be an outer surface of an electronic device. The glass article can, for example, correspond to a glass cover that helps form part of a display area of an electronic device (e.g., situated in front of a display either as a separate part or integrated within the display). Alternatively or additionally, the glass article may form a part of the housing. For example, it may form an outer surface other than the display area.

These and other embodiments are discussed below with reference to FIGS. 1-16. However, those skilled in the art will readily appreciate that the detailed description given herein with respect to these figures is for explanatory purposes only and should not be construed as limiting.

Figure 1:
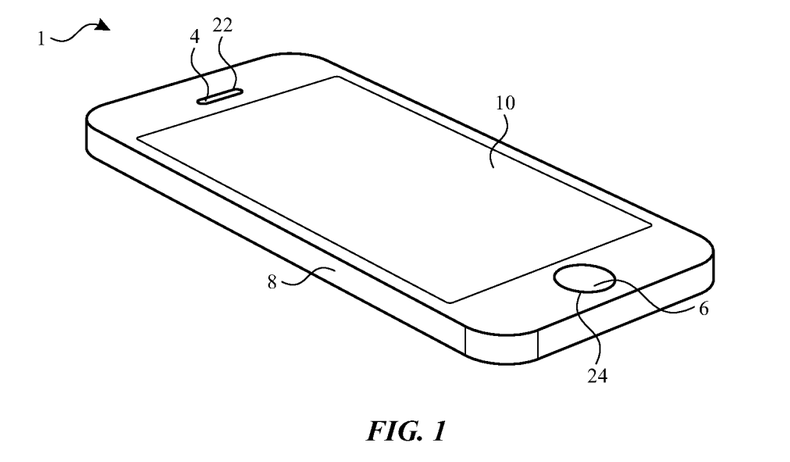
FIG. 1 shows a perspective view of an exemplary electronic device.

Referring to FIG. 1, an electronic device 1 can be a portable or handheld electronic device having a thin form factor. The electronic device 1 can, for example, correspond to a portable media player, a media storage device, a portable digital assistant ("PDA"), a tablet, a computer, a mobile communication device (e.g., cellular phone or smart phone), a GPS unit, a remote control device, wristwatch, and the like. The electronic device 1 can be referred to as a consumer electronic device.

The electronic device 1 can include a housing 8 that serves as an outer surface for electronic device 1. Electrical components (not shown) are disposed within the housing 8. The electrical components can include a controller (or processor), memory, battery, and a display (e.g., LCD display). The electronic device 1 has a glass article 10 provided over a display area. The glass article 10 serves as an external surface, i.e., top surface, for the electronic device 1. The glass article 10 can be clear or transparent so that the display area can be viewed through the glass article 10. The glass article 10 also resists scratching and therefore provides a substantially scratch-resistance surface for the top surface of the housing 8 for the electronic device 1. The display area can alternatively or additionally include a touch sensing device positioned over a display screen. For example, the display area can include one or more glass layers having capacitive sensing points distributed thereon. As further shown in FIG. 1, the glass article 10 can extend across the entire top surface of the housing 8. In such a case, the edges of the glass article 10 are aligned, or substantially aligned, with the sides of the housing 8. However, the glass article 10 can alternatively only be provided over a portion of a given surface of the housing 8.

The glass article 10 can include one or more openings to receive components of the electronic device 1 and/or provide access to an internal portion of the electronic device 1. For example, the electronic device 1 can include one or more audio speakers 4, and the glass article 10 can provide one or more openings 22 that provides a pathway for sound emitted from the speaker 4. By further example, the electronic device 1 can include one or more buttons 6, and the glass article 10 can provide one or more openings 24 for receiving the buttons 6. A variety of other openings can be provided for access or communication.

Figure 2:
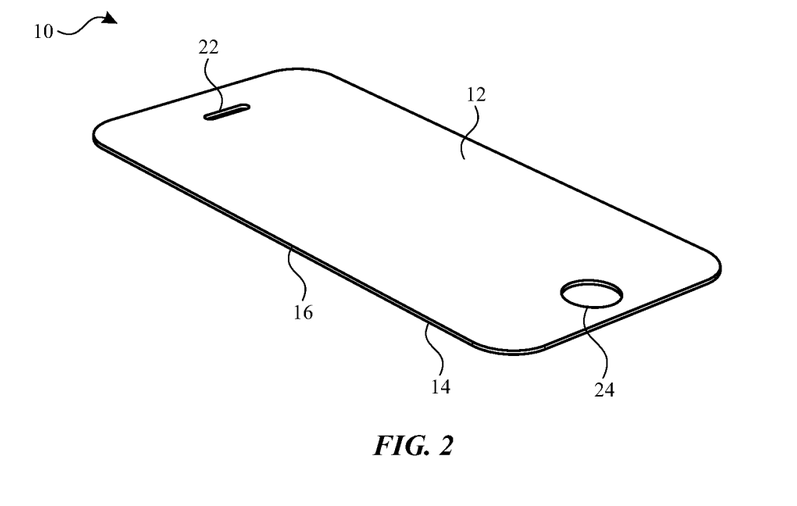
FIG. 2 shows a perspective view of an exemplary glass article for the electronic device of FIG. 1.

Referring to FIG. 2, the glass article 10 is a thin sheet of glass. For example, the thickness of the glass in many applications is less or equal to 3 mm. The length, width or area for the glass article 10 is dependent on the application. One application for the glass article 10 is as a cover glass for a housing of an electronic device, such as a portable or handheld electronic device. As illustrated in FIG. 2, the glass article 10 can include a front surface 12, a back surface 14, and one or more side surfaces 16. The openings 22 and 24 can extend to the glass article 10, for example from the front surface 12 to the back surface 14. The glass material for the glass article 10 can be selected from glass that has adequate strength. For example, alumino silicate glass is a suitable choice for the glass material for the glass article 10. Other examples of glass materials include, but are not limited to, soda lime, borosilicate, and the like. The glass article 10 can be formed into an appropriate size, such as, for example, by singulating and/or machining.

Figure 3:
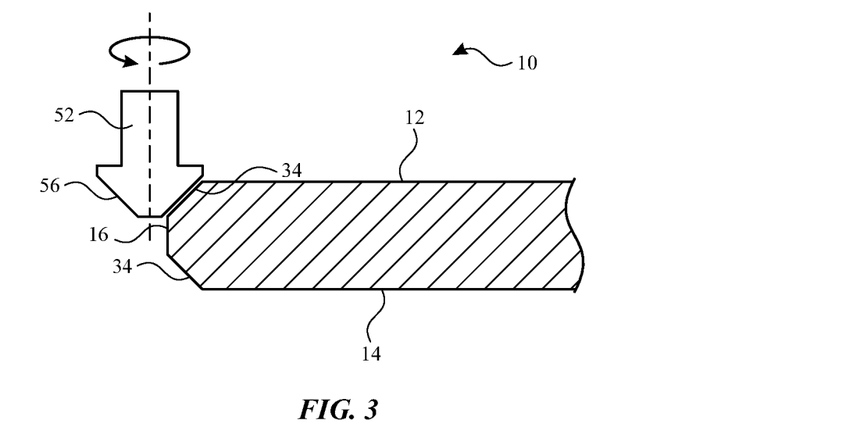
FIG. 3 shows a sectional view of a glass article being machined to form an outer edge.
Figure 4:
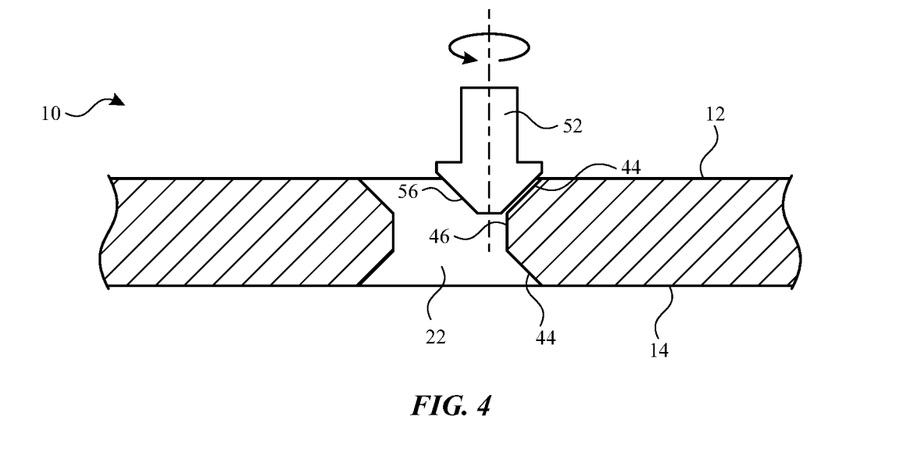
FIG. 4 shows a sectional view of a glass article being machined to form an inner edge.

Referring to FIGS. 3 and 4, a glass article 10 can be machined to provide a desired shape. As shown in FIG. 4, a machining tool 52 can be controlled to move around an outer periphery of the glass article 10 to form outer edges 34 with a predetermined edge geometry. The machining tool 52 includes at least one machining surface 56 that is used to machine or otherwise manipulate the outer edges 34. For example, the machining surface 56 can machine, grind, cut, etch, scribe, mold, slump or otherwise form the outer edges 34 to the predetermined edge geometry. The outer edges 34 can also be polished. The outer edges 34 can be formed as a transition between the front surface 12 and the side surface 16. Additionally or alternatively, the outer edges 34 can be formed as a transition between the back surface 14 and the side surface 16.

As shown in FIG. 4, the glass article 10 can also include an opening 22 such as for a speaker, microphone, button, etc. While the opening 22 is depicted, it will be recognized that the description can be applied to the opening 24 and/or another opening. The opening 22 can have inner edges 44 that can be shaped by a machining tool 52. The machining tool 52 includes at least one machining surface 56 that is used to machine or otherwise manipulate the inner edges 44. For example, the machining surface 56 can machine, grind, cut, etch, scribe, mold, slump or otherwise form the inner edges 44 to the predetermined edge geometry. The inner edges 44 can also be polished. The inner edges 44 can be formed as a transition between the front surface 12 and the inner surface 46. Additionally or alternatively, the inner edges 44 can be formed as a transition between the back surface 14 and the inner surface 46.

The edge features of the inner edges 44 and outer edges 34 can be applied according to preferred shapes in an end product. For example, edge features can be selected for aesthetic preference, tactile comfort, smooth transitions to adjacent structures (e.g., a housing), and/or a variety of other purposes. While the edge features of the inner edges 44 and outer edges 34 illustrated in FIGS. 3 and 4 include chamfers, it will be recognized that one or more other types of edge features can be applied. For example, one or more edge features can include a chamfer, curve, spline curve, s-curve, bevel, fillet, radius, taper, step, right angle, and/or other angle. It should be appreciated that the edge geometries shown are by way of example, and are not to be construed as being limiting. The width and thickness depicted in the figures are not to scale and are only for purposes of illustration. Although all of the inner edges 44 and outer edges 34 of the glass article 10 can be machined, it should be noted that not all of the edges need to be machined. Depending on the particular embodiment or design, machining can be performed on only one or more of the edges of the glass article 10. For a given edge, all or a portion of the edge can be machined into a predetermined geometry. Also, different edges can be machined differently (i.e., different edges can have different geometries). Also, some edges can a predetermined geometry while other edges can remain sharp. Across a given edge being machined, the predetermined geometry can also vary.

In general, formation of edge features can produce flaws (e.g., cracks) in the glass article. For example, a region that has been machined to form an edge structure can have a greater surface roughness on a surface thereof than a surface that has not been machined.

By further example, the region that is been machined to form an edge structure can have a greater number of cracks extending from a surface into the glass article. It should also be noted that different edge profiles can yield different flaws at different depths from the edge when being formed. Flaws can appear at transitions, such as between curved radius and a straight surface. The edge features that are formed or processed to have a cleaner edge finish (or less surface roughness), e.g., with polishing, can yield smaller flaws.

Referring to FIGS. 5-8, the glass article can be chemically treated for strengthening differently in different regions thereof. Chemical strengthening can increase the strength of the glass article, for example at regions having greater surface roughness and a greater number of cracks. Other regions of the glass article can also be chemically strengthened to a different depth. Chemical strengthening can, for example, be performed on the glass article by placing the glass article in a chemical solution with which the glass article can interact, such as by ion exchange.

Figure 5:
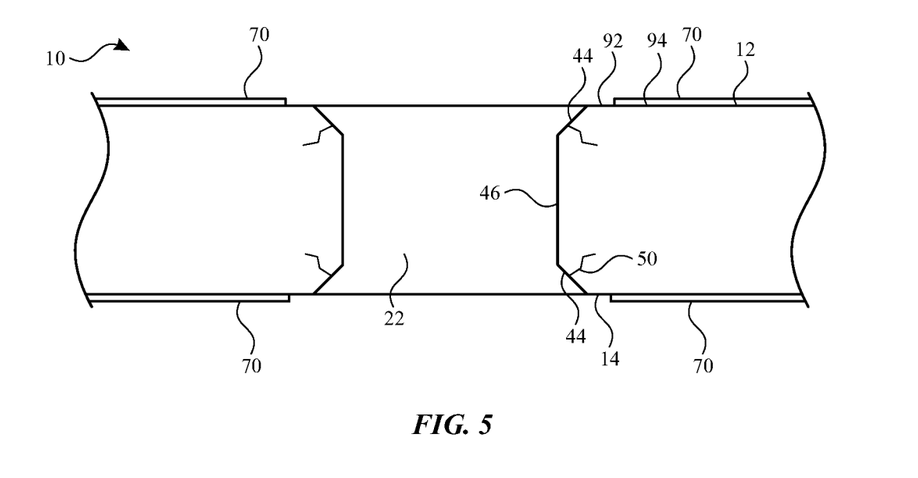
FIG. 5 shows a sectional view of a glass article in a first stage of a chemical strengthening process.

As shown in FIG. 5, different regions of the glass article 10 can have different features that can result, at least in part, from a process used to form the glass article 10. A first region 92 of the glass article 10 can include a feature formed by machining the glass article 10, for example as described above. Such features can include inner edges 44 and/or inner surfaces 46. While not depicted in FIG. 5, such features can include outer edges and/or side surfaces of the glass article 10, and description of the inner edges 44 and/or inner surfaces 46 can be applied to the outer edges and/or side surfaces. Machining the glass article 10, for example in at least a portion of the first region 92, can create relatively greater surface roughness and relatively more and deeper cracks 50 than at another region of the glass article, such as a second region 94, which is not subject to machining. The surface roughness and presence of cracks creates susceptibilities to cracking within the first region 92. As such, the first region 92 can be strengthened with a compression layer that is deeper than a compression layer formed within the second region 94.

As used herein, a surface roughness refers to deviations of a surface in the direction of the normal vector from its ideal (e.g., planar) form. Surface roughness is a component of a surface texture. Surface roughness can be measured, calculated, and/or compared based on one of a variety of uniform methodologies. For example, surface roughness parameters are included in BS EN ISO 4287:2000 British standard, identical with the ISO 4287:1997 standard. A surface roughness parameter can include an arithmetical mean deviation of a surface profile. For example, surface roughness can be defined in terms of the parameter $R_a$, which defines the arithmetic average value of a filtered roughness profile determined from deviations about a center line within the evaluation length. While the parameter $R_a$ refers to a one-dimensional roughness parameter, other parameters, such as the parameter $S_a$, can be referenced to define the arithmetic average of the 3D roughness. It will be recognized that one or more of a variety of other surface roughness parameters can be referenced. Where the surface roughness of two or more different regions are compared, the same surface roughness parameter or parameters can be referenced.

As described herein, the first region 92 can have a surface roughness that is greater than a surface roughness of the second region 94. For example, the first region 92 can have a surface roughness parameter that is greater than 10 µm. By further example, the first region 92 can have a surface roughness parameter that is greater than 1 µm, 2 µm, 3 µm, 4 µm, 5 µm, 6 µm, 7 µm, 8 µm, 9 µm, 10 µm, 15 µm, 20 µm, 30 µm, 40 µm, 50 µm, or 60 µm. In contrast, the second region 94 can have a lower surface roughness. For example, the second region 94 can have a surface roughness parameter that is less than 10 µm. By further example, the second region 94 can have a surface roughness parameter that is less than 1 nm, 10 nm, 100 nm, 1 µm or 10 µm.

As described herein, the first region 92 can have a greater number, density, and/or depth of cracks 50 than the second region 94. The regions can have compression layers that extend at least to the depth of the cracks within the corresponding region.

As further shown in FIG. 5, a mask 70 can be applied to a portion of the glass article 10 for selective chemical strengthening. In particular, the first region 92 of the glass article 10 can be subjected to chemical strengthening while the second region 94 is initially isolated from chemical strengthening. The mask 70 can be applied to the second region 94 to form a barrier that is impermeable to a chemical bath used for the chemical strengthening. The mask 70 can include silicon nitride, silicon dioxide, or another material that is impermeable to the chemical bath. The mask 70 can be applied to at least a portion of the front surface 12 and/or at least a portion of the back surface 14. The first region 92 can remain exposed for interaction with the chemical bath. The first region 92 can correspond to a region that has been machined, includes and/or is adjacent to an edge feature, has greater surface roughness, and/or has more or deeper cracks. For example, the first region 92 can include a portion of the front surface 12, one or more inner edges 44, an inner surface 46, and/or a portion of the back surface 14. The first region 92 can include a portion of the front surface 12 and/or the back surface 14 that is adjacent to one or more inner edges 44. Where the glass article 10 has a uniform thickness between the front surface 12 and the back surface 14, each of the first region 92 and the second region 94 can include a portion of the uniform thickness section of the glass article 10. As such, the first region 92 can include portions of the glass article 10 other than the inner edges 44 and the inner surface 46.

Figure 6:
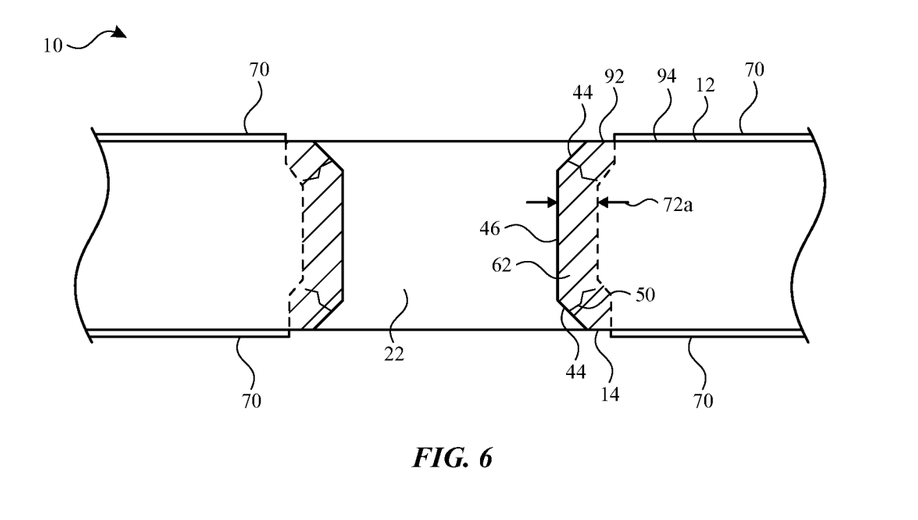
FIG. 6 shows a sectional view of the glass article of FIG. 5 in a second stage of the chemical strengthening process.

As shown in FIG. 6, a portion of the glass article 10 can be subjected to chemical strengthening. For example, the glass article 10, including the mask 70, can be placed in a chemical bath containing alkali metal ions for a period of time at an elevated temperature, as will be described further herein. The chemical treatment can desirably result in higher compression stresses at the exposed surface(s) of the glass article 10. In particular, a first compression layer 62 can be formed within the first region 92. The first compression layer 62 can extend to a first depth 72a, as measured from a surface of the first region 92. In particular, the first compression layer 62 can extend at least to a depth of one or more cracks 50 within the first region 92.

Figure 7:
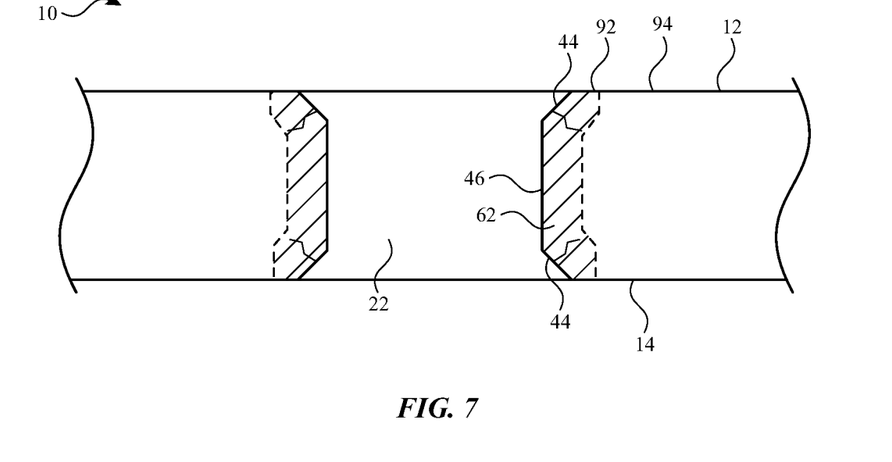
FIG. 7 shows a sectional view of the glass article of FIG. 5 in a third stage of the chemical strengthening process.

As shown in FIG. 7, the mask can be removed from the glass article 10 to expose both the first region 92 and the second region 94. The mask can be chemically and/or mechanically removed. For example, the glass article 10 and the mask can be treated with sodium hydroxide or another substance to decompose the mask. The removal of the mask preferably does not influence features of the glass article 10, including the first compression layer 62.

Figure 8:
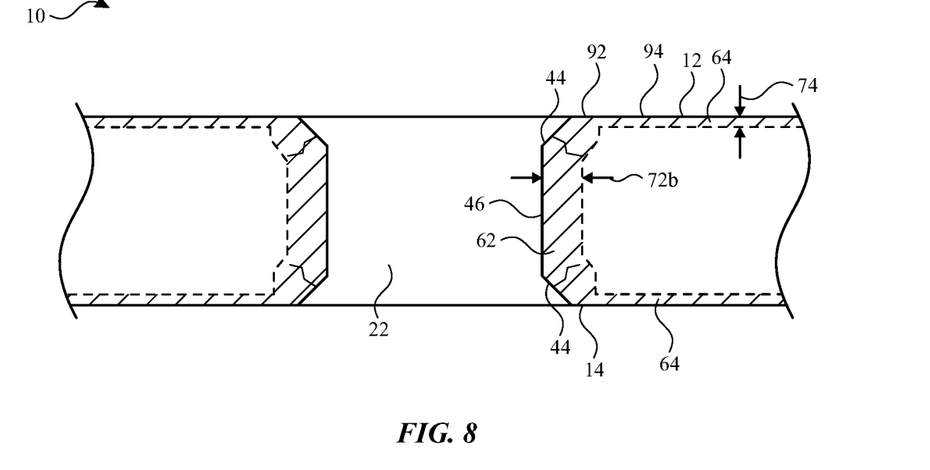
FIG. 8 shows a sectional view of the glass article of FIG. 5 in a fourth stage of the chemical strengthening process.

As shown in FIG. 8, the glass article 10 can again be subjected to chemical strengthening. For example, the glass article 10, without the mask, can be placed in a chemical bath containing alkali metal ions for a period of time at an elevated temperature, as will be described further herein. The second chemical treatment can form a second compression layer 64 within the second region 94. The second compression layer 64 can extend to a second depth 74, as measured from a surface of the second region 94. Furthermore, the chemical treatment can further extend the first compression layer 62 to the first depth 72b within the first region 92. After the second chemical treatment, the first depth 72b of the first compression layer 62 can be greater than the second depth 74 of the second compression layer 64. Furthermore, the first depth 72b of the first compression layer 62 after the second treatment can be greater than the first depth 72a of the first compression layer 62 after the first treatment. Accordingly, the target depth for the first compression layer 62 (e.g., depth of cracks) need not be achieved after the first treatment. Alternatively or additionally, the first region 92 can be masked during a second treatment, so that the first compression layer 62 is not significantly enlarged during the second treatment.

The first depth 72b can be greater than the second depth 74. The first depth 72b can be about 10-200 μm. By further example, the first depth 72b can be about 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm. The second depth 74 can be about 50-400 μm. By further example, the second depth 74 can be about 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 250 μm, 300 μm, 350 μm, or 400 μm.

Figure 9:
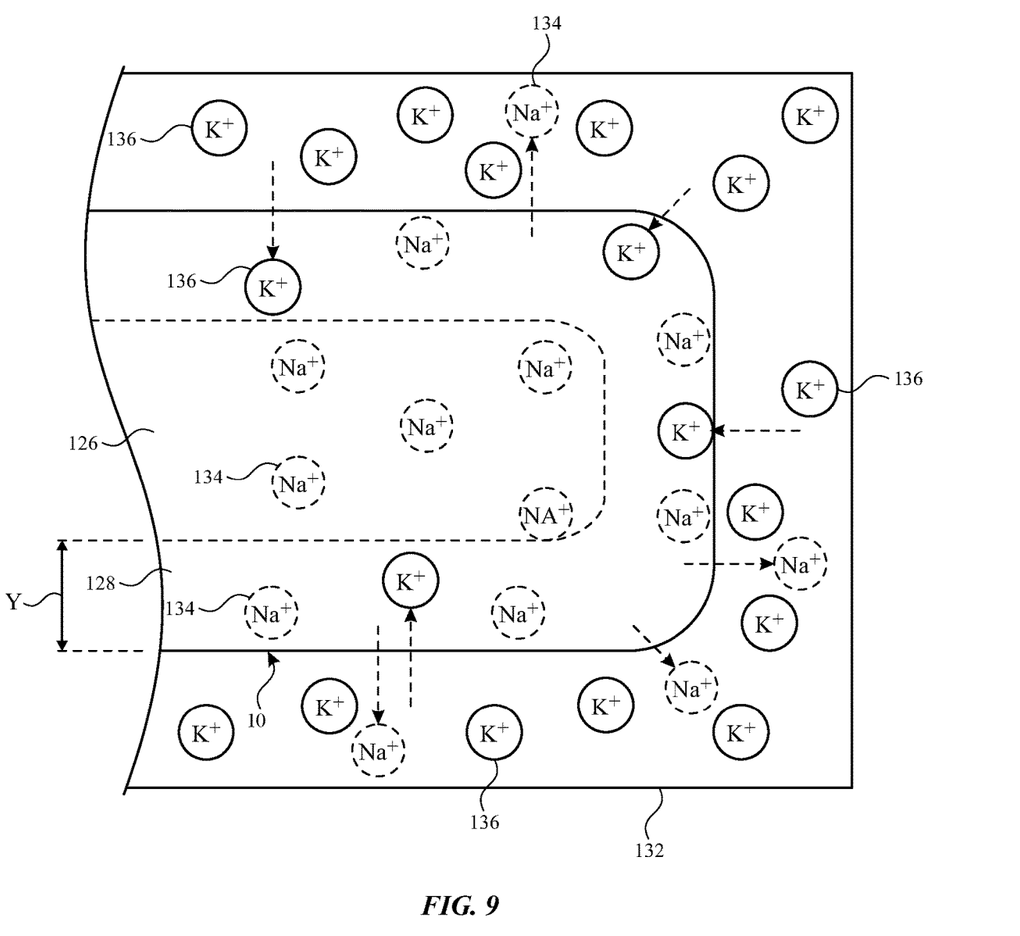
FIG. 9 shows a diagram of a chemical treatment process that involves submerging a glass article in an ion bath.

Referring to FIG. 9, an exemplary chemical treatment is described for treating surfaces of a glass article. In the chemical treatment steps described above (i.e., with and without a mask), an exemplary process can include submerging the glass article in a heated ion bath. It will be understood that the discussion of FIG. 9 can be applied to formation of the first compression layer 62 and/or the second compression layer 64 shown in FIGS. 6 and 8. As shown in FIG. 9, when the glass article 10, which is partially shown in cross-section, is submerged or soaked in a heated ion bath 132, an exchange of alkali metal ions, such as lithium, sodium, potassium, rubidium, cesium, or francium, occurs.

The ion bath 132 can include alkali metal ions 134. The alkali metal ions 134 (e.g., sodium (Na)) which are present in the glass article 10 diffuse into the ion bath 132 while the alkali metal ions 136 (e.g., potassium (K)) in the ion bath 132 diffuse into the glass article 10, such that a compression layer 128 is formed. In the depicted example, alkali metal ions 136 from the ion bath 132 can be exchanged with alkali metal ions 134 to form the compression layer 128. Conditions can be controlled such that the alkali metal ions 136 do not diffuse into a center portion 126 of glass article 10. Accordingly, the compression layer 128 has a greater density of alkali metal ions than other portions of the glass article 10 (e.g., the center portion 126). By controlling the duration (i.e., time) of a chemical strengthening treatment, temperature, and/or the concentration of alkali metal ions 136 in the ion bath 132, the thickness (e.g., depth) of the compression layer 128 can be controlled. If desired, the glass article 10 can be polished after chemical treatment. Polishing can, for example, remove any haze or residue on the glass piece following the chemical treatment.

While sodium and potassium are depicted in FIG. 9, it will be recognized that other pairs of alkali metal ions can be exchanged. For example, the alkali metal ions 134 and 136 can be any two or more of lithium, sodium, potassium, rubidium, cesium, and francium. The alkali metal ions 136 from the ion bath 132 can be heavier than the alkali metal ions 134 from the glass article 10, so that the compression layer has a greater internal expansion force than before the chemical treatment.

The concentration of alkali metal ions in an ion bath can be varied while a glass article is soaking in the ion bath. For example, the concentration of alkali metal ions in an ion bath can be maintained substantially constant, can be increased, and/or can be decreased while a glass article is submerged in the ion bath.

The chemical treatment parameters of treatment stages with and without the mask can be the same or different. For example, the duration (i.e., time) of a chemical strengthening treatment, temperature, and/or the concentration of alkali metal ions in the ion bath can be the same or different for the separate treatment stages (i.e., with and without the mask). It should be noted that the treatment parameters do not need to be different to create compression layers having different depths. Generally, successive treatment applied to the same region can have an additive effect to further deepen a compression layer. Therefore, where one of two regions is masked during a first stage and both regions are exposed in a second stage, the depth of the compression layers in the two regions can be different even if the treatment parameters are identical for both of the stages.

Figure 10:
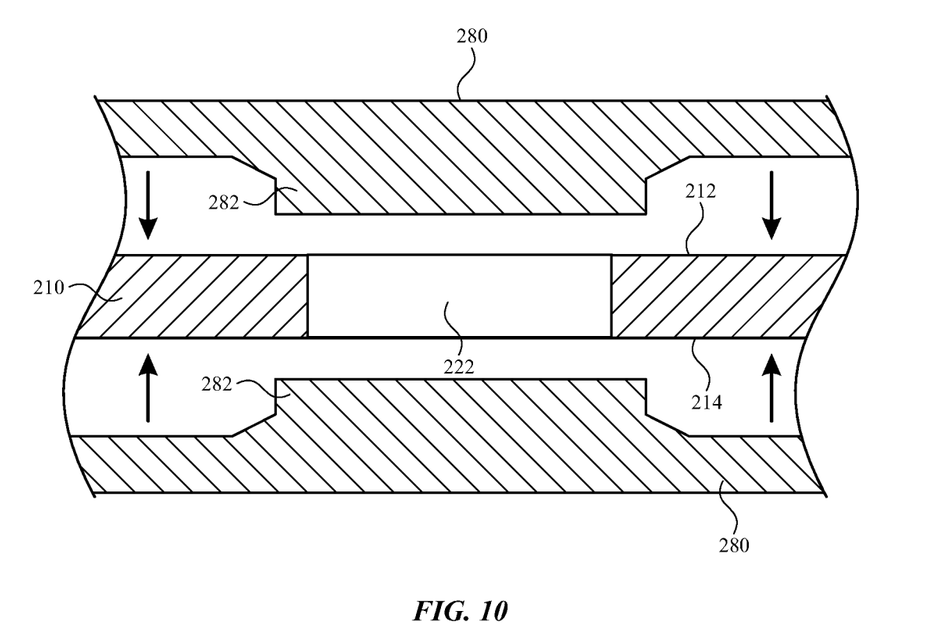
FIG. 10 shows a sectional view of a glass article in a first stage of a shaping process.

Referring to FIGS. 10-13, edge features of a glass article can also be formed in a manner that reduces flaws, such as cracks. As shown in FIG. 10, a glass article 210 can be provided. The glass article 210 can be similar to the glass article 10 in several respects. The glass article 210 can include an opening 222 that extends from a front surface 212 to a back surface 214 of the glass article 210. While not depicted, the glass article 210 can include one or more side surfaces that also connect the front surface 212 to a back surface 214 along a periphery of the glass article 210. While processes and features are described herein with respect to edges of the opening 222, it will be recognized that the same processes and features can be applied to one or more side surfaces along the periphery of the glass article 210.

As further shown in FIG. 10, one or more press molds 280 can be provided, for example, on opposing sides of the glass article 210. Each of the press molds 280 can include one or more press surfaces 282 that include a predetermined geometry to create the desired features in the glass article 210. The press surfaces 282 of separate press molds 280 can be the same, similar, or different from each other.

Figure 11:
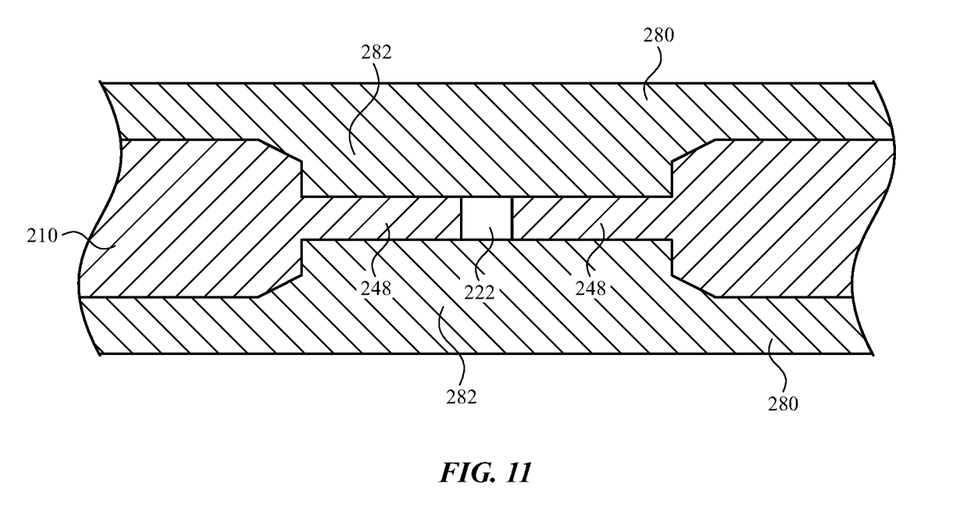
FIG. 11 shows a sectional view of the glass article of FIG. 10 in a second stage of the shaping process.

As shown in FIG. 11, the glass article 210 can be heated to a softening temperature thereof, and the one or more press molds 280 can be applied to the glass article 210 to impose a shape thereon. For example, the press molds 280 can be brought towards each other and the glass article 210 until the press surfaces 282 deform and shape corresponding portions of the glass article 210. While some portions of the glass article 210 can remain substantially unchanged, other portions can be deformed into elongated portions 248 extending into a void between the press molds 280. For example, the elongated portions 248 can be deformed into the previously unoccupied opening 222.

Figure 12:
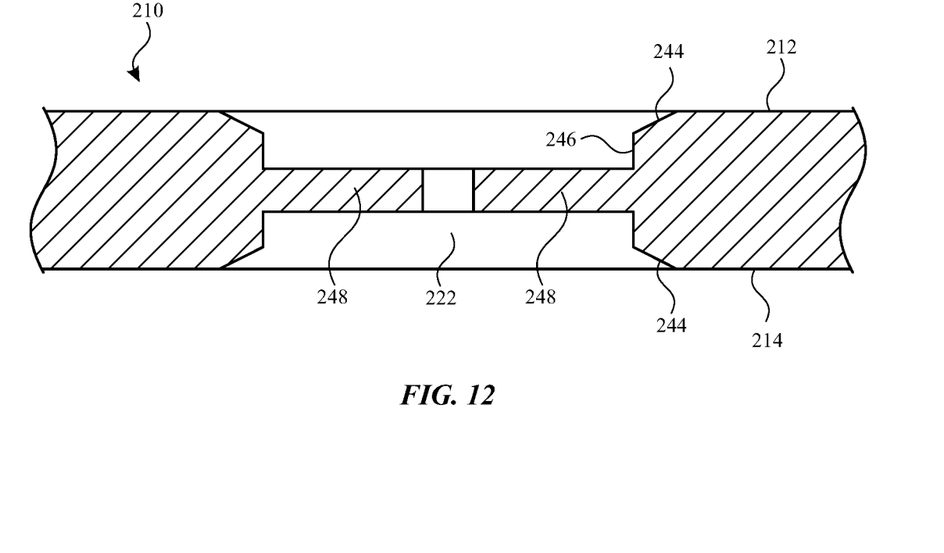
FIG. 12 shows a sectional view of the glass article of FIG. 10 in a third stage of the shaping process.

As shown in FIG. 12, the press molds can be removed from the glass article 210. A resulting shape of the glass article 210 can be complementary to the press molds 280. One or more inner edges 244 can be formed as a transition between the front surface 212 and the inner surface 246. Additionally or alternatively, one or more inner edges 244 can be formed as a transition between the back surface 214 and the inner surface 246. While the edge features of the inner edges 244 illustrated in FIG. 12 include chamfers, it will be recognized that one or more other types of edge features can be applied. For example, one or more edge features can include a chamfer, curve, spline curve, s-curve, bevel, fillet, radius, taper, step, right angle, and/or other angle.

Figure 13:
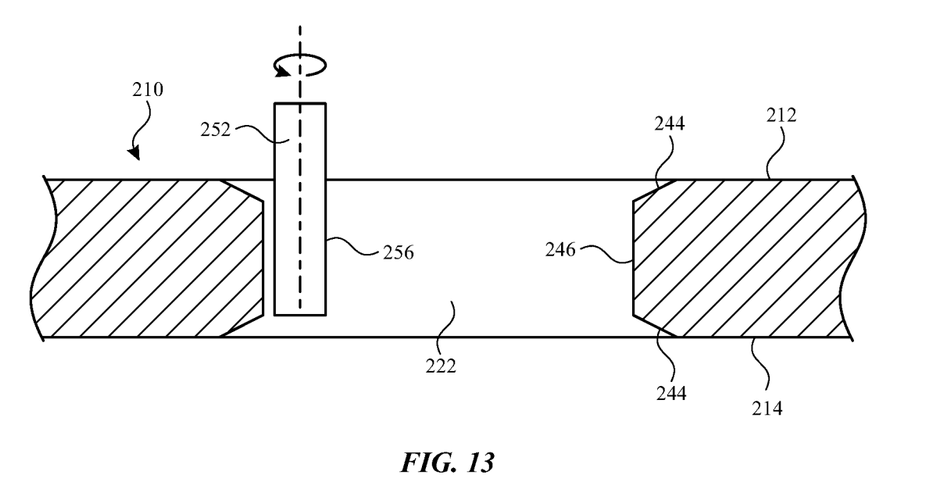
FIG. 13 shows a sectional view of the glass article of FIG. 10 in a fourth stage of the shaping process.

As shown in FIG. 13, the elongated portions 248 can be removed and/or reduced to further define the opening 222. A machining tool 252 includes at least one machining surface that is used to machine or otherwise manipulate the elongated portions 248. For example, the machining surface 256 can machine, grind, cut, etch, scribe, mold, slump or otherwise remove and/or reduce the elongated portions 248. By further example, the elongated portions 248 can be substantially removed so that the inner surface 246 is continuous between opposing inner edges 244. The inner edges 44 can also be polished.

At least a portion of the glass article 210 can be subject to chemical strengthening. For example, the portions of the inner surface 246 that are machined during removal of the elongated portions 248 can have a greater surface roughness and more cracks than other portions of the glass article 210. In particular, the inner edges 244 can have less surface roughness than the inner surface 246, in part because the inner edges 244 are formed by the press molds 280, rather than by a machining tool. As described herein with respect to the process illustrated in FIGS. 5-8, regions of the glass article 210 (e.g., the front surface 212, the back surface 214, and/or the inner edges 244) that have a lower surface roughness can be masked during at least one chemical treatment, while other regions of the glass article 210 (e.g., the inner surfaces 246) that have a greater surface roughness can be exposed to create a compression layer. Additionally, the regions that are masked in one chemical treatment can be exposed in a separate chemical treatment, so that different regions of the glass article 210 have compression layers of different depths.

Figure 14:
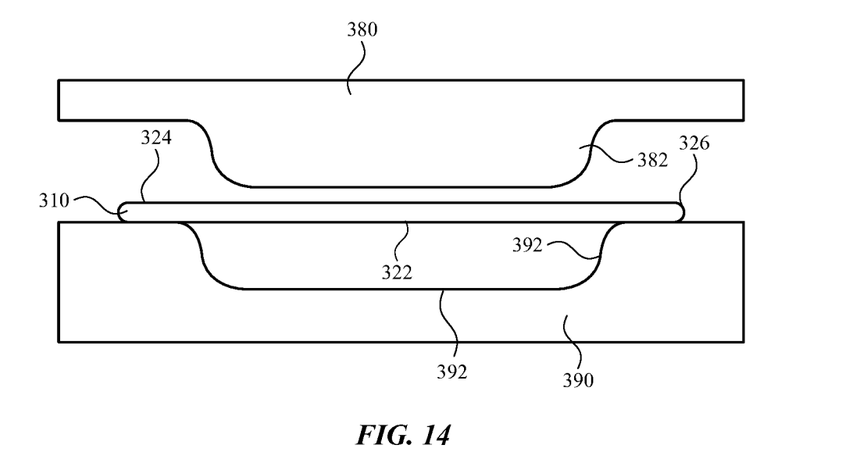
FIG. 14 shows a sectional view of a glass article in a first stage of a shaping process.
Figure 15:
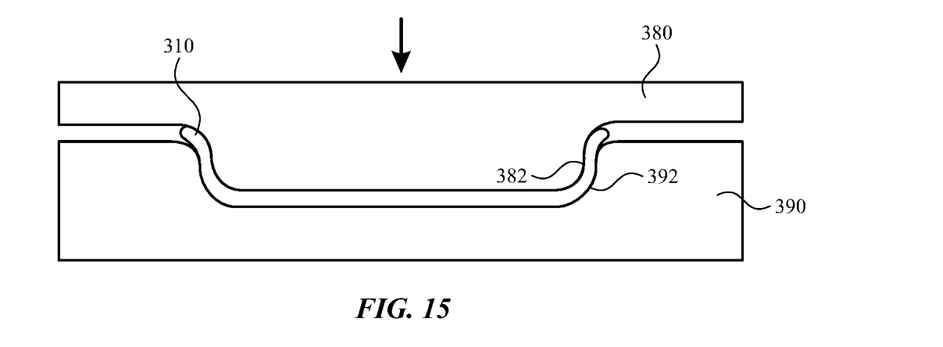
FIG. 15 shows a sectional view of the glass article of FIG. 14 in a second stage of the shaping process.
Figure 16:
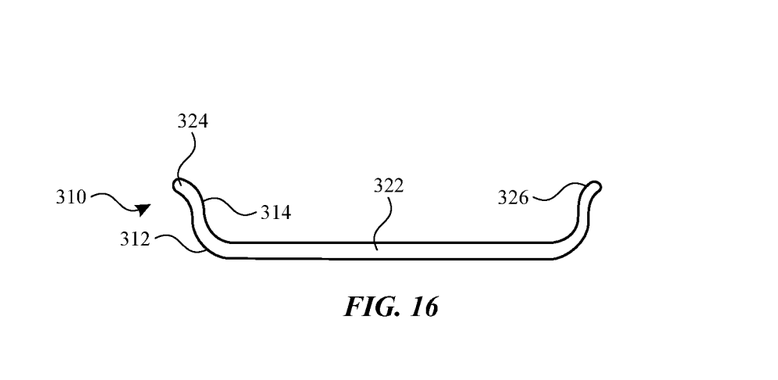
FIG. 16 shows a sectional view of the glass article of FIG. 14 in a third stage of the shaping process.

Referring to FIGS. 14-16, edge features and contours of a curved glass article can also be formed in a manner that reduces flaws, such as cracks. As shown in FIG. 14, a glass article 310 can be provided. The glass article 310 can be similar to the glass article 10 in several respects. The glass article 310 can include one or more side surfaces 324 and 326 that connect a front surface 312 to a back surface 314 along a periphery of the glass article 310. While not depicted, the glass article 310 can include an opening within a middle region 322 of the glass article 310 that extends from the front surface 312 to the back surface 314 of the glass article 310.

As further shown in FIG. 14, one or more press molds 380 and 390 can be provided, for example, on opposing sides of the glass article 310. One or both of the press molds 380 and 390 can include a press surface 382 or 392 that includes a predetermined geometry to create the desired features in the glass article 310. The press surfaces 382 and 392 of separate press molds 380 and 390 can be the same, similar, or different from each other. For example, as shown in FIG. 14, a first press mold 380 can include a press surface 382 that is complementary to a second press surface 392 of a second press mold 390. By further example, where the first press mold 380 provides a protrusion or convex portion, the second press mold 390 can provide a cavity or concave portion.

As shown in FIG. 15, the glass article 310 can be heated to a softening temperature thereof, and the press molds 380 and 390 can be applied to the glass article 310 to impose a shape thereon. For example, the press molds 380 and 390 can be brought towards each other and the glass article 310 until the press surfaces 382 and 392 deform and shape corresponding portions of the glass article 310. While some portions of the glass article 310 can remain substantially unchanged, other portions can be molded to conform to the press surfaces 382 and 392. For example, glass article 310 can be changed from a flat or planar shape to a curved shape. It will be recognized that the press molds 380 and 390 can be configured to provide a space, void, or gap there between to be filled by the glass article 310.

As shown in FIG. 16, the press molds can be removed from the glass article 310. A resulting shape of the glass article 310 can be complementary to the press molds 380 and 390. For example, a front surface 312 of the glass article 310 can include at least one convex portion, and a back surface 314 of the glass article 310 can include at least one concave portion. Additionally or alternatively, one or both of the front surface 312 and a back surface 314 can include at least one convex portion, at least one concave portion, and/or at least one flat or planar portion. Based on the geometry imposed upon the glass article 310, the side surfaces 324 and 326 can be disposed at a location that is not coplanar with the flat middle region 322 of the glass article 310. One or more inner edges and/or outer edges of the glass article 310 can be formed as a transition between the front surface 312 and the back surface 314. For example, one or more edge features can include a chamfer, curve, spline curve, s-curve, bevel, fillet, radius, taper, step, right angle, and/or other angle.

The techniques described herein can make selected regions of glass substantially stronger, which can be of particular importance as the glass gets thinner. Strength (or overall strength) of a glass article can be a flexural strength that can be measured. For example, a four-point bending test can be performed in accordance with ASTM Standard C158-02: Standard Test Methods for Strength of Glass by Flexure.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A glass article for an electronic device, the glass article comprising:
   a first region having a first surface roughness, wherein the first region defines a first compression layer having a first depth, wherein the first surface roughness has a corresponding surface roughness parameter $R_a$ that is greater than 10 µm; and
   a second region having a second surface roughness less than the first surface roughness, wherein the second region defines a second compression layer having a second depth less than the first depth.

2. The glass article of claim 1, wherein the first region includes an edge comprising a chamfer, curve, spline curve, s-curve, bevel, fillet, radius, or taper.

3. The glass article of claim 1, wherein the first region includes an edge at a periphery of an opening that extends through the glass article.

4. The glass article of claim 1, wherein the glass article comprises: a front surface; and
   a back surface, wherein the first region includes an edge at a transition between the front surface to the back surface.

5. The glass article of claim 1, wherein a thickness of the glass article is uniform across at least a portion of the first region and at least a portion of the second region.

6. The glass article of claim 1, wherein the first and second compression layers each have a greater density of alkali metal ions than other portions of the glass article.

7. The glass article of claim 1, wherein the first depth is greater than a depth of a crack extending from a surface of the first region.

8. The glass article of claim 1, wherein the first depth is greater 50 μm and the second depth is less than 50 μm.

9. A method of strengthening a glass article for an electronic device, the method comprising:
   applying a mask to a glass article having a first region and a second region, the first region having a first surface roughness and the second region having a second surface roughness less than the first surface roughness, wherein the first region includes an edge and the mask covers the second region, wherein the first surface roughness has a corresponding surface roughness parameter $R_a$ that is greater than 10 μm;
   forming a first compression layer in the first region by chemically strengthening the first region;
   removing the mask; and
   forming a second compression layer in the second region by chemically strengthening the second region, wherein the first compression layer has a first depth and the second compression layer has a second depth less than the first depth.

10. The method of claim 7, further comprising, prior to applying the mask, machining the first region of the glass article to form the edge.

11. The method of claim 7, further comprising:
    prior to applying the mask, heating the glass article having opposing first and second surfaces and a third surface connecting the first and second surfaces;
    applying a press mold to the glass article to form the edge at the first surface or the second surface and to form an elongated portion at the third surface; and
    removing the elongated portion from the third surface such that the third surface is substantially flat.

12. The method of claim 7, further comprising:
    prior to applying the mask, heating the glass article; and
    applying a press mold to the glass article to form curved surfaces on the glass article.

13. The method of claim 12, wherein the curved surfaces comprise a concave portion on a first side of the glass article and a convex portion on a second side of the glass article, the second side being opposite the first side.

14. The method of claim 7, wherein the first and second compression layers each have a greater density of alkali metal ions than other portions of the glass article.

15. The method of claim 7, further comprising, while forming the second compression layer in the second region, enlarging the first compression layer in the first region.

16. A glass article for an electronic device, the glass article comprising:
    a first region, wherein the first region defines a first compression layer having a first depth and a first surface roughness having a corresponding surface roughness parameter $R_a$ that is greater than 10 μm; and
    a second region, wherein the second region defines a second compression layer having a second depth less than the first depth and having a second surface roughness less than the first surface roughness,
    wherein the glass article has a uniform thickness across the first region and the second region.

17. The glass article of claim 16, further comprising an edge adjacent to a portion of the first region that has the uniform thickness.

18. The glass article of claim 17, wherein the edge is disposed at a periphery of an opening that extends through the glass article.

19. The glass article of claim 16, wherein the first and second compression layers each have a greater density of alkali metal ions than other portions of the glass article.

* * * * *